(12) United States Patent  
Cromer et al.

(10) Patent No.: US 9,304,591 B2
(45) Date of Patent: Apr. 5, 2016

(54) GESTURE CONTROL

(75) Inventors: Daryl Cromer, Cary, NC (US); Axel Ramirez Flores, Durham, NC (US); Harriss Christopher Neil Ganey, Cary, NC (US); Jay Wesley Johnson, Raleigh, NC (US); Howard Locker, Cary, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 524 days.

(21) Appl. No.: 12/853,747

(22) Filed: Aug. 10, 2010

(65) Prior Publication Data
US 2012/0038546 A1 Feb. 16, 2012

(51) Int. Cl.
G09G 5/00 (2006.01)
G06F 3/01 (2006.01)
G06F 1/16 (2006.01)
H04M 1/725 (2006.01)

(52) U.S. Cl.
CPC .............. *G06F 3/017* (2013.01); *G06F 1/1626* (2013.01); *G06F 1/1684* (2013.01); *G06F 1/1694* (2013.01); *G09G 5/00* (2013.01); *G06F 2200/1637* (2013.01); *G06F 2203/04806* (2013.01); *H04M 1/72569* (2013.01); *H04M 2250/12* (2013.01)

(58) Field of Classification Search
CPC ........... G09G 5/00; G09G 5/02; H04M 3/493; H04M 1/00; G06F 3/033
USPC ................. 345/165–183, 156, 660; 455/414.2
See application file for complete search history.

(56) References Cited

U.S. PATENT DOCUMENTS

| 7,689,115 | B2 | 3/2010 | Takahashi |
| 8,030,914 | B2 | 10/2011 | Alameh |
| 2006/0238502 | A1 | 10/2006 | Kanamori et al. |
| 2007/0268246 | A1* | 11/2007 | Hyatt ............................ 345/156 |
| 2008/0074443 | A1 | 3/2008 | Taniguichi et al. |
| 2008/0089613 | A1 | 4/2008 | Cho et al. |
| 2008/0100825 | A1 | 5/2008 | Zalewski |

(Continued)

FOREIGN PATENT DOCUMENTS

| CN | 101150609 A | 3/2008 |
| CN | 101236307 A | 8/2008 |

(Continued)

OTHER PUBLICATIONS

Eslambolchilar et al., "Control Centric Approach in Designing Scrolling and Zooming User Interfaces", International Journal of Human-Computer Studies, vol. 66, pp. 838-856, 2008.

(Continued)

*Primary Examiner* — Nicholas Lee
*Assistant Examiner* — Abdul-Samad A Adediran
(74) *Attorney, Agent, or Firm* — Brian J. Pangrle

(57) ABSTRACT

An apparatus includes sensor circuitry configured to sense spatial phenomena; application circuitry configured to respond to sensation of a spatial phenomenon by the sensor circuitry where a pre-existing relationship exists between the spatial phenomenon and the response of the application circuitry; and regulation circuitry configured to regulate the response of the application circuitry to the spatial phenomenon based at least in part on sensation of a different spatial phenomenon by the sensor circuitry. Various other apparatuses, systems, methods, etc., are also disclosed.

19 Claims, 9 Drawing Sheets

(56) References Cited

U.S. PATENT DOCUMENTS

| | | |
|---|---|---|
| 2008/0211778 A1* | 9/2008 | Ording et al. ............... 345/173 |
| 2010/0041431 A1 | 2/2010 | Kim et al. |
| 2010/0066763 A1 | 3/2010 | MacDougall et al. |
| 2010/0123664 A1 | 5/2010 | Shin et al. |
| 2010/0123737 A1 | 5/2010 | Williamson et al. |
| 2010/0125816 A1 | 5/2010 | Bezos |
| 2010/0136957 A1* | 6/2010 | Horodezky et al. ........ 455/414.2 |
| 2010/0156907 A1* | 6/2010 | VanderSpek et al. ......... 345/427 |
| 2010/0188397 A1 | 7/2010 | Tsai et al. |
| 2010/0222119 A1 | 9/2010 | Suzuki |
| 2011/0037778 A1 | 2/2011 | Deng et al. |
| 2011/0148930 A1* | 6/2011 | Lee et al. .................... 345/660 |
| 2011/0167391 A1 | 7/2011 | Momeyer et al. |

FOREIGN PATENT DOCUMENTS

| | | |
|---|---|---|
| CN | 101356493 A | 1/2009 |
| CN | 101739205 A | 11/2009 |
| CN | 101599267 A | 12/2009 |
| WO | 2010076772 A2 | 12/2010 |

OTHER PUBLICATIONS

AN3182 Application Note, "Tilt measurement using a low-g 3-axis accelerometer", Apr. 2010, Doc ID 17289 Rev 1, STMicroelectronics.

* cited by examiner

GESTURE CONTROL

RELATED APPLICATIONS

This application is related to U.S. patent application Ser. No. 12/853,715, entitled "Assisted Zoom", filed on Aug. 10, 2010, which is incorporated by reference herein.

TECHNICAL FIELD

Subject matter disclosed herein generally relates to techniques for controlling display of information.

BACKGROUND

A natural tendency exists for a person having difficulty seeing something on a display to move the display closer. This is particularly easy to do with a handheld display device. Physical movement, however, is not always sufficient, for example, where a user still cannot see information clearly or not always prudent, for example, where the device comes so close to a user's face that the user loses sight of his surroundings. Current zooming solutions require a user to use a manual zoom function such as touch screen, mouse click etc. on the display device to increase the relative size of the item being viewed. Such an approach requires a manual, often non-intuitive action. As described herein, various exemplary technologies provide enhanced control of zooming and optionally other display functions.

SUMMARY

An apparatus includes sensor circuitry configured to sense spatial phenomena; application circuitry configured to respond to sensation of a spatial phenomenon by the sensor circuitry where a pre-existing relationship exists between the spatial phenomenon and the response of the application circuitry; and regulation circuitry configured to regulate the response of the application circuitry to the spatial phenomenon based at least in part on sensation of a different spatial phenomenon by the sensor circuitry. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, a natural tendency exists for a person having difficulty seeing information on a display to move the display closer. As described herein, an operational mode can be implemented that allows a user to amplify or otherwise control or respond to a natural, intuitive reaction (e.g., such as a user bringing a display closer to see displayed information more clearly). Such a mode can rely on one or more types of sensors. For example, sensor circuitry configured to sense a shrinking distance between a user and a device can automatically provide zooming functionality according to a zoom amplification factor, which may be selectable (e.g., scalable) by a user. In a particular example, a user could set a zooming amplification factor to 2× such that when the device moved from 60 cm to 50 cm (physical zoom is 10 cm), the device zooms the display to effectuate a "virtual" 20 cm zoom (e.g., as if the device moved from 60 cm to 40 cm). Types of sensors can include camera, proximity, light, accelerometer, audio, gyroscope, etc., for example, to provide a signal or data sufficient to determine distance between a device and a user.

As described herein, a device may automatically activate zoom in or out functionality based at least in part on distance between a device and an object (e.g., user head, user hand, etc.). As described herein, the functionality may depend on the information being displayed by a device, an application executing on a device, etc. For example, a device may implement a reverse-zoom to display "more" information such as for a map of a GPS application where the GPS application reacts inversely to a photo or video display application. In a GPS example, as a user moves away from a display of a device, sensor circuitry can detect the change in distance and display more geography, as if the user was flying away from the ground.

As described herein, in various examples, sensor circuitry of a device can be configured to sense one or more gestures. For example, sensor circuitry may be configured to distinguish movement of an object with respect to a device from movement of the device (e.g., movement of a face moving versus movement of a handheld device).

Figure 1:
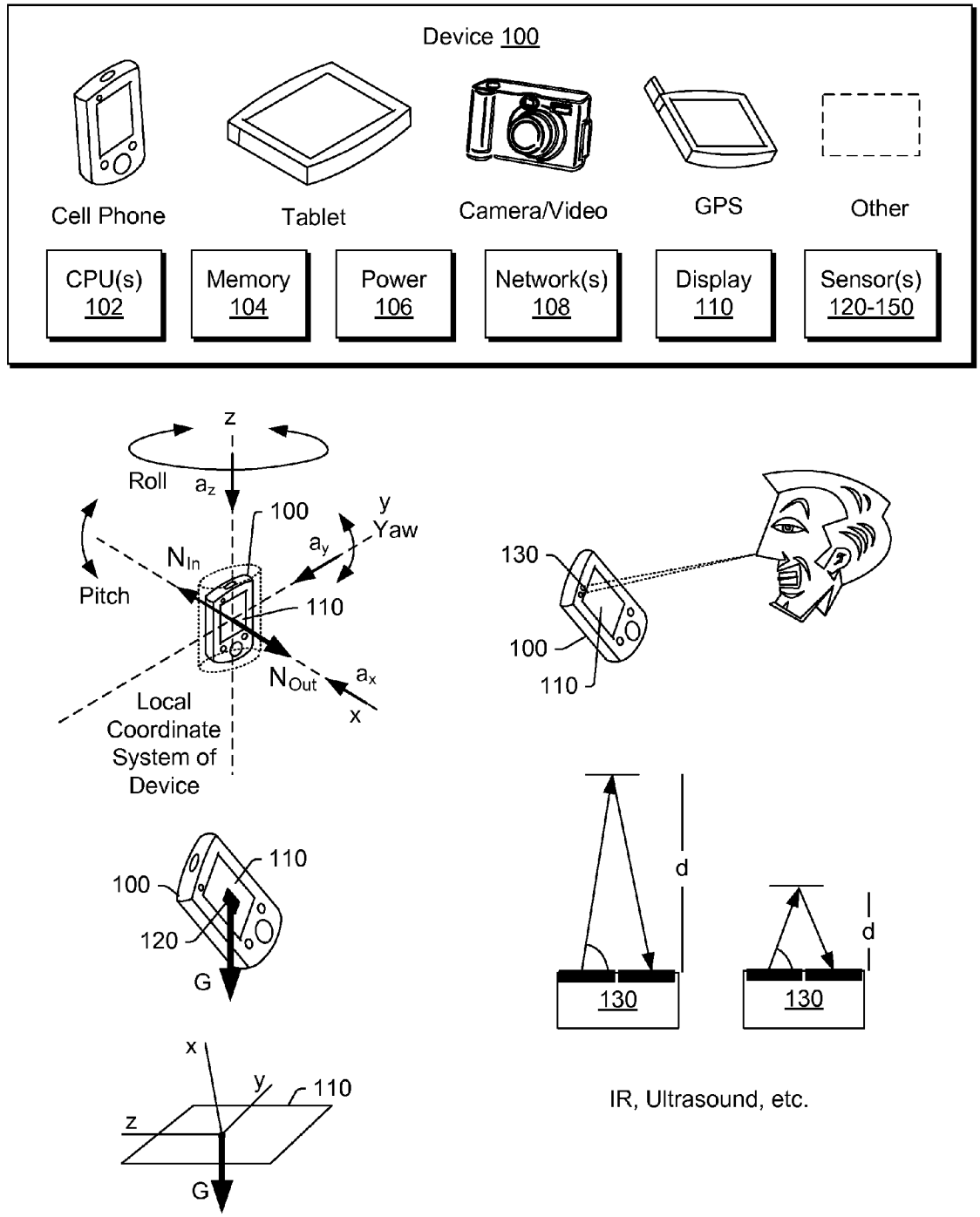
FIG. 1 is a diagram of various configurations of a device along with some examples of sensor technology.

FIG. 1 shows various configurations of a device 100 along with some examples of sensor technology. The device 100 may be configured as a cell phone, a tablet, a camera (e.g., still, video, still and video), a GPS device or other device. The device 100 may include one or more features from at least one of the aforementioned devices. The device 100 includes particular features such as one or more processors 102, memory 104, power source 106, one or more network interfaces 108, at least one display 110 and one or more sensors 120-150.

FIG. 1 shows an example of a sensor 120 that can detect acceleration, twist (e.g., roll, pitch, yaw) or a combination of acceleration and twist. The sensor 120 may be configured to distinguish an angle with respect to gravity. In the example of FIG. 1, the display 110 of the device 100 lies in a yz-plane and the sensor 120 may be configured with one or more axes coincident with the y-axis, the z-axis or both the y- and z-axes. The sensor 120 can optionally include a gyroscope and a three-axis accelerometer, which may be configured to sense motion with up to six degrees of freedom.

FIG. 1 also shows an example of a sensor 130 that can detect distance between the device 100 and an object (e.g., a user). The sensor 130 may rely on one or more of infrared, ultrasound, laser, or other technologies. In the example of FIG. 1, the sensor 130 includes an emitter and a detector, which may be configured to provide information sufficient to determine an angle and thereby a distance between the sensor 130 and an object.

Figure 2:
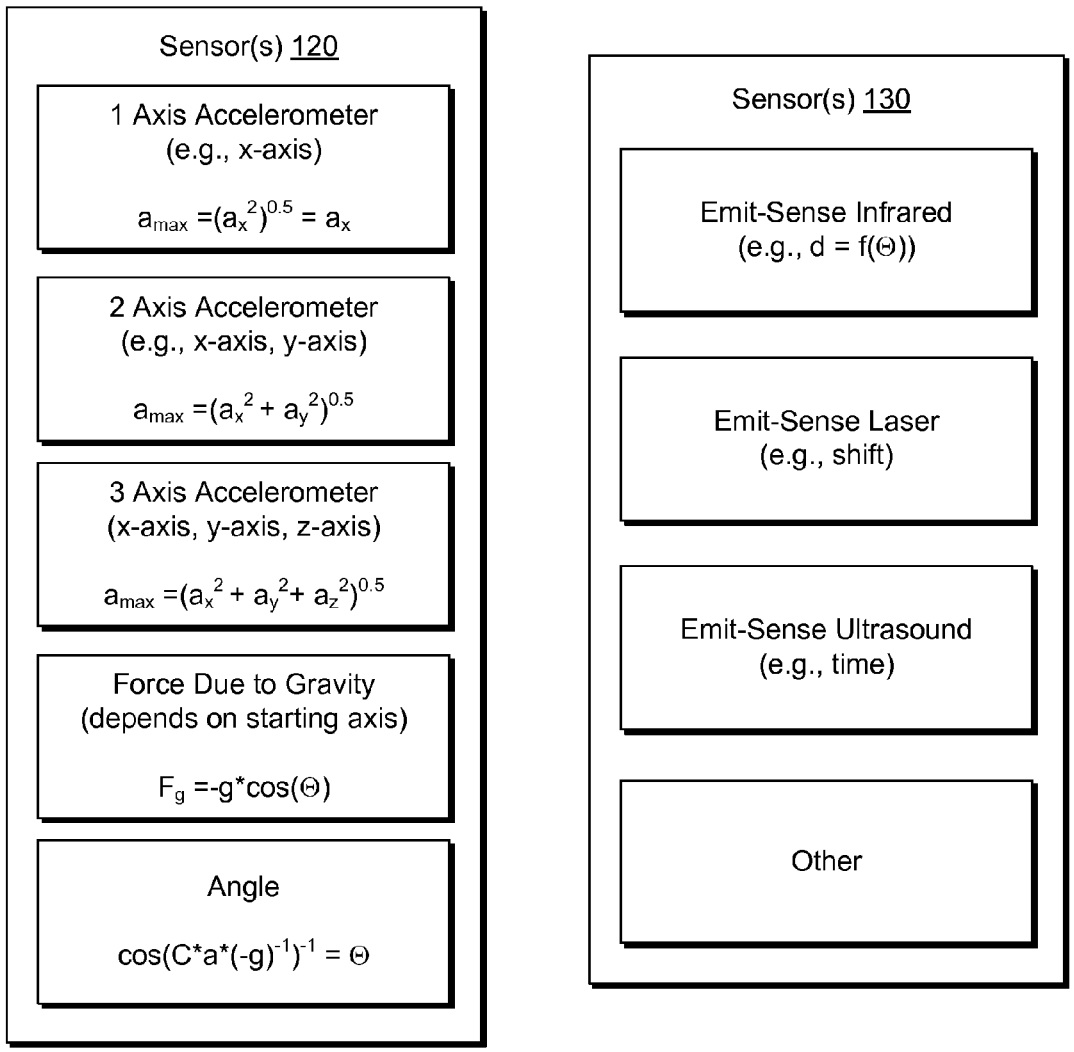
FIG. 2 is a diagram of some sensor-based algorithms and an example of a method that can receive information from one or more sensors and call for implementation of action based at least in part on such information.
Figure 2:
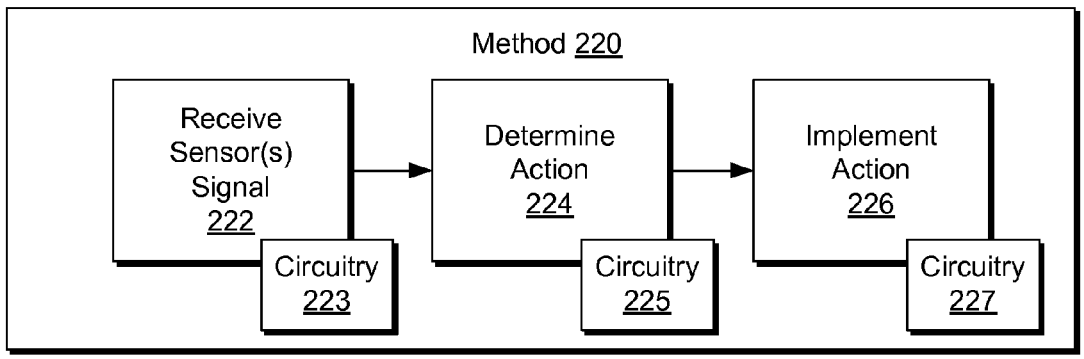

FIG. 2 shows some examples of algorithms as associated with the sensor 120 and some examples of algorithms as associated with the sensor 130. A method 220 includes a reception block 222 that receives one or more sensor signals, a determination block 224 to determine action based at least in part on the one or more received sensor signals and an implementation block 226 to call for implementation of action (e.g., as determined per the determination block 224). In the example of FIG. 2, the blocks are shown along with circuitry 223, 225 and 227 configured to perform various functions.

Figure 3:
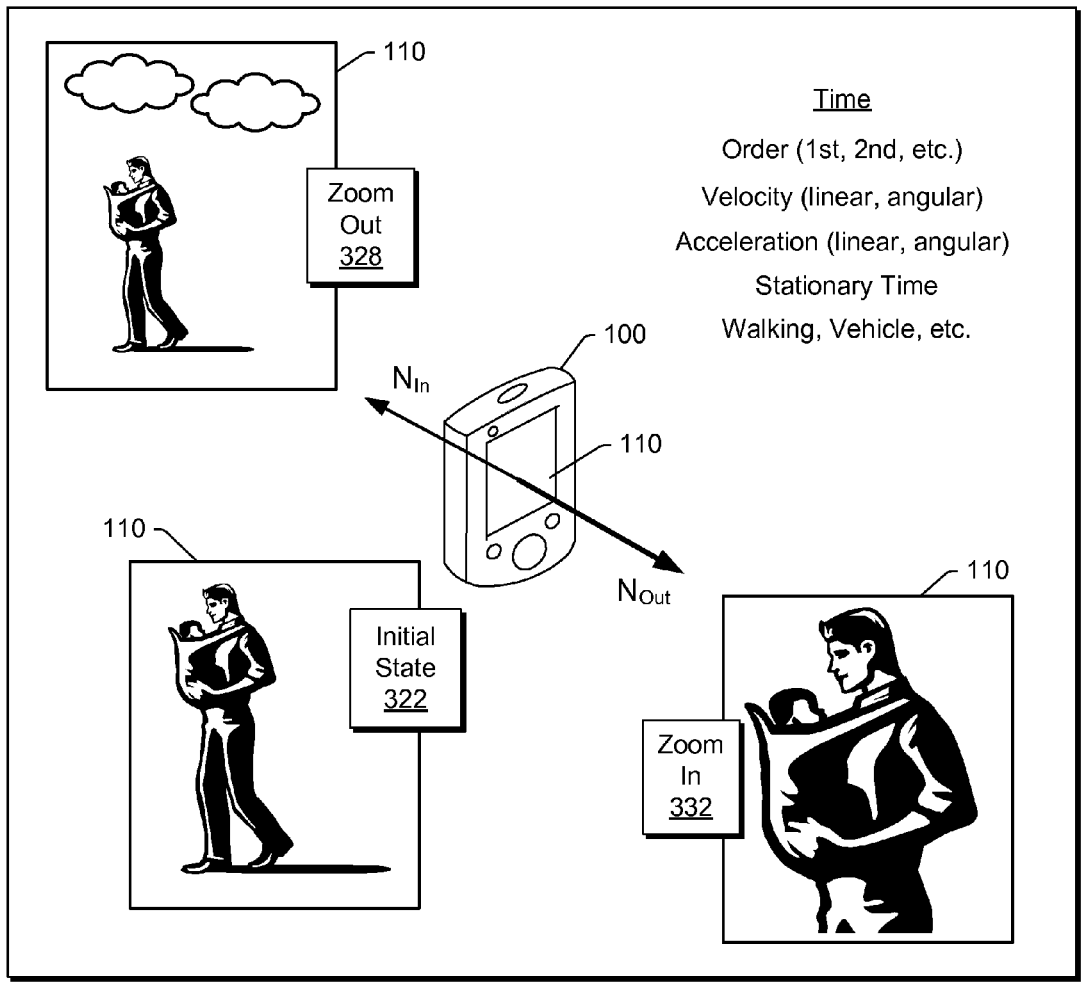
FIG. 3 is a diagram of a device with zoom functionality.
Figure 3:
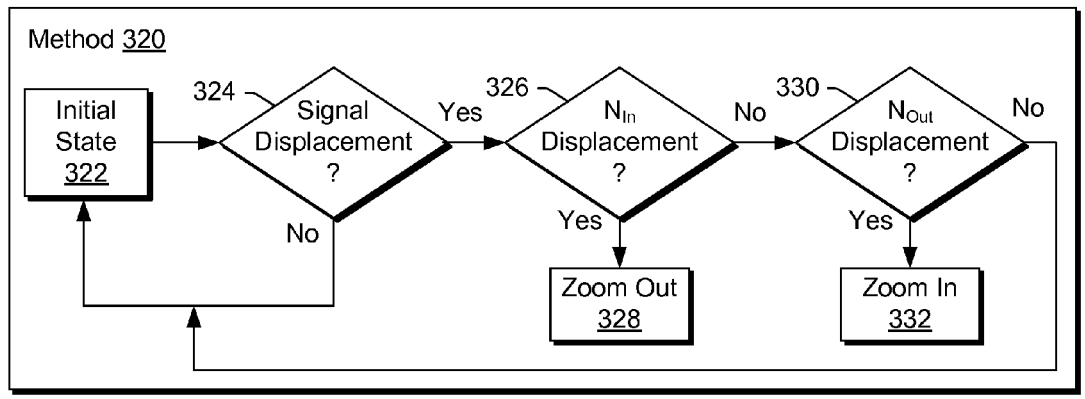

FIG. 3 shows an example of the device 100 with zoom functionality in association with a method 320. The display 110 of the device 100 may define an inward pointing normal (pointing into the display) and an outward pointing normal (pointing out from the display). The method 320 commences in an initiation block 322 that registers an initial state (e.g., initial position of the device 100). A decision block 324 decides whether a signal indicates that the device 100 has been displaced from its initial position. If no displacement is indicated, then the method 320 returns to the initiation block 322. However, if the decision block 324 decides that displacement is indicated, then the method 320 continues to another decision block 326 that decides whether the displacement occurred along the inward pointing normal ($N_{In}$). If so, the method 320 enters a zoom out block 328 that zooms out to, for example, show more information on the display. However, if the decision block 326 decides that the indicated displacement is not along the inward pointing normal, the method 320 continues to another decision block 330 that decides whether the displacement occurred along the outward pointing normal ($N_{Out}$). If so, the method 320 continues at a zoom in block 332 that zooms in to, for example, show less information (e.g., a close-up view of a displayed image). If the decision block 330 decides that the indicated displacement is not along the outward pointing normal, the method 320 returns to, for example, the initiation block 322. Accordingly, the method 320 may analyze one or more signals and determine whether the one or more signals indicate that movement is toward or away from a user and call for an appropriate response. While the example of FIG. 3 shows "zoom out" for movement along the inward pointing normal (e.g., movement with a non-zero vector component along the inward pointing normal) and shows "zoom in" for movement along the outward pointing normal (e.g., movement with a non-zero vector component along the outward pointing normal), as mentioned, depending on the configuration of the device 100, the type of information displayed or type of application displaying information, the relationships may differ from those shown.

FIG. 3 also shows various manners by which time may be used in conjunction with displacement. For example, as to order, a first type of displacement (e.g., down-to-up) may occur prior to a second type of displacement (e.g., left-to-right) or where a device is moved from an initial positional state (e.g., center), to an intermediate positional state (e.g., upward from center) to a final positional state (e.g., downward and forward from center). As to velocity, sensor circuitry may include a timer or other circuitry to sense or determine velocity (e.g., linear or angular or linear and angular). As to acceleration, sensor circuitry may be configured to acceleration along one or more axes, rotational directions, etc. As to stationary time, sensor circuitry may be configured to sense a pause at a position (e.g., a second to a few seconds). Stationary time may be sensed with respect to a device being placed in a dock, a stand, being placed on a table (or other horizontal surface), etc. As to a stand, the stand may be configured with a particular angle where sensing of the angle by the device (e.g., for more than a few seconds) indicates to the device that it has been placed in the stand. For example, upon placement in a stand, a device configured with cell phone circuitry may automatically switch to audio output via a speaker phone (e.g., if sensor circuitry senses an angle of 83 degrees for three seconds, switch to speaker phone).

As described herein, a device can include circuitry to determine whether a person is walking, driving, etc. Such circuitry may filter out walking or otherwise ignore signals associated with walking. Where a device includes camera or video circuitry, certain movement may optionally activate anti-motion circuitry to enhance quality of image capture.

Figure 4:
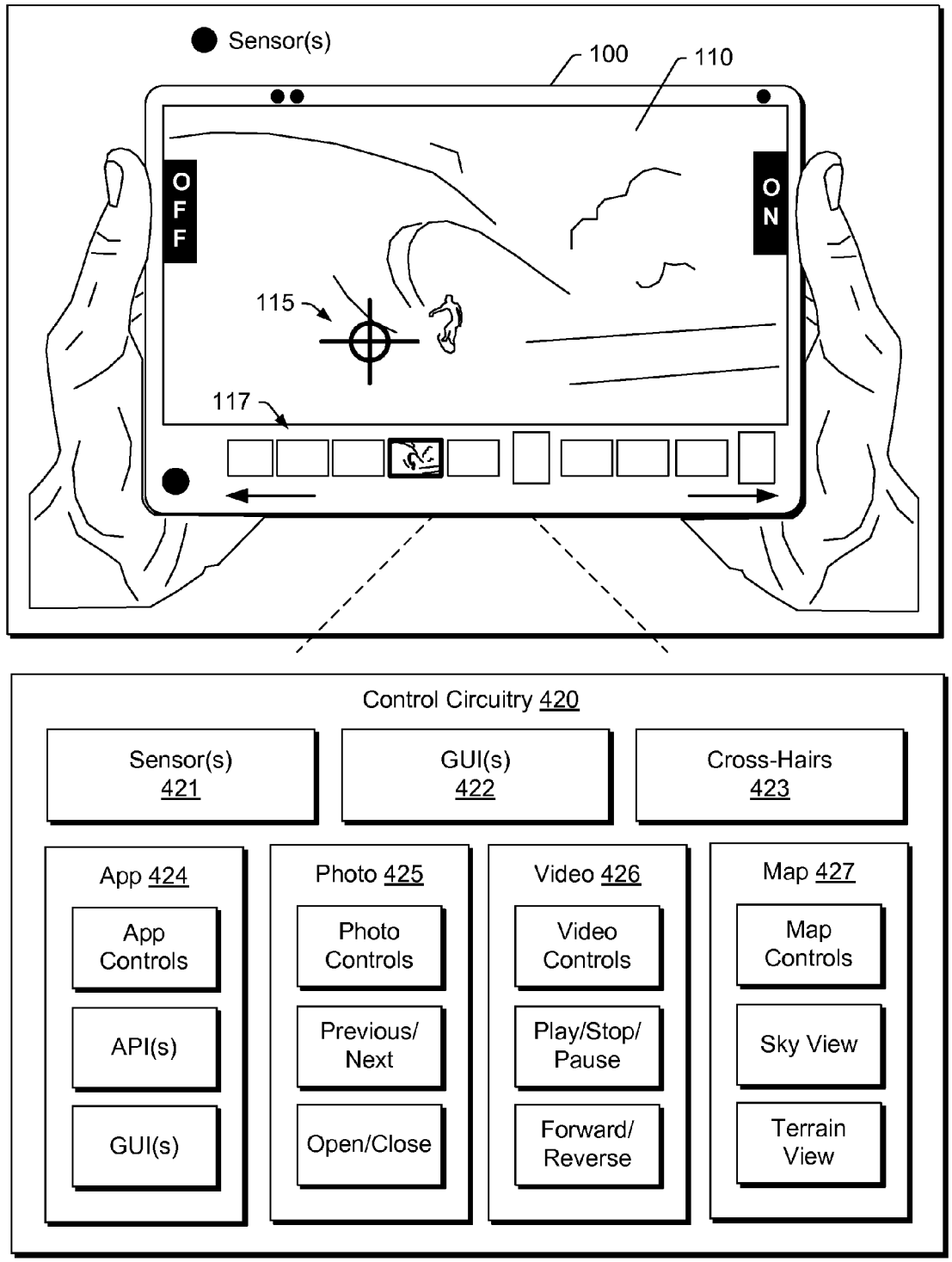
FIG. 4 is a diagram of a device with control circuitry for controlling display of information on the device.

FIG. 4 shows a device 100 with control circuitry 420 for controlling display of information on the device. The device 100 includes display 110 and cross-hairs 115 as well as thumbnails 117 and optional graphical buttons "ON" and "OFF" (e.g., positioned on opposing sides/edges of the display 110). As described herein, the cross-hairs 115 may be manipulated by maneuvering the device 100. For example, the cross-hairs 115 may be located over a particular region of a displayed image to select a center for zooming or other operation. With respect to the graphical buttons, these may be "touch" activated or, for example, optionally activated via positioning of the cross-hairs 115 (e.g., to turn on or off zoom functionality). The thumbnails 117 may optionally be navigated and selected by tilting or other maneuvering of the device 100, optionally with assist from the cross-hairs 115. As described herein, the device 100 may be configured to respond to a tapping motion, for example, where a tap to a side of the device 100 activates an accelerometer.

In the example of FIG. 4, the control circuitry 420 includes sensor circuitry 421 for sensing, GUI(s) circuitry 422 for display and control of one or more GUIs (e.g., the on/off buttons) and cross-hairs circuitry 423 for display and control of cross-hairs 115. The control circuitry 420 further includes control circuitry that may be application or function specific. For example, application specific circuitry 424 includes application controls, one or more application programming interfaces (APIs) and one or more GUIs. The APIs may allow for interactions between an application and sensor circuitry. Photo specific circuitry 425 includes photo controls as well as previous/next and open/close functionality that may be implemented in conjunction with thumbnails such as the thumbnails 117. Video specific circuitry 426 includes video controls as well as play/stop/pause and forward/reverse functionality that may be implemented in conjunction with thumbnails such as the thumbnails 117. Map specific circuitry 427 includes map controls as well as sky view and terrain view functionality, which may depend on angle of the display 110. For example, an angle sensor (e.g., gyro or accelerometer) may sense angle of a display 110, optionally with respect to gravity, and render a map view based at least in part on the sensed angle. In such an example, as the angle moves from the display 110 being oriented horizontally to being oriented vertically, the view may change from a sky view (e.g., overhead) to a terrain view (e.g., side or street view).

Figure 5:
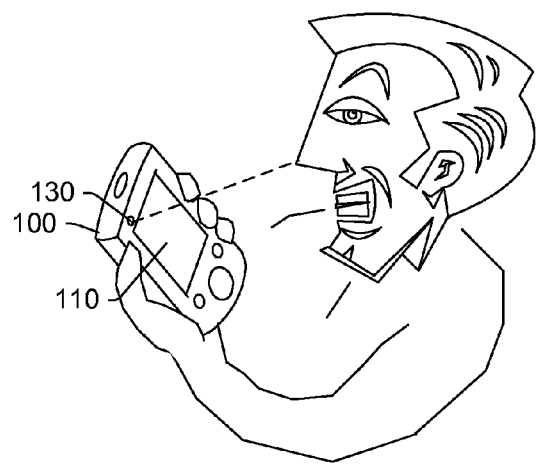
FIG. 5 is a diagram of a handheld device and some examples of sensing distance between the device and an object such as a user.
Figure 5:
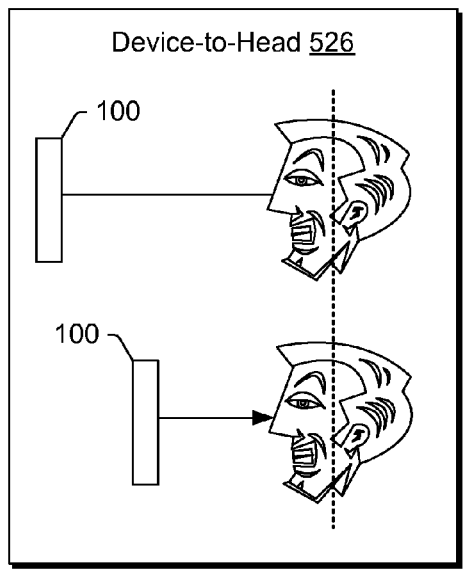
Figure 5:
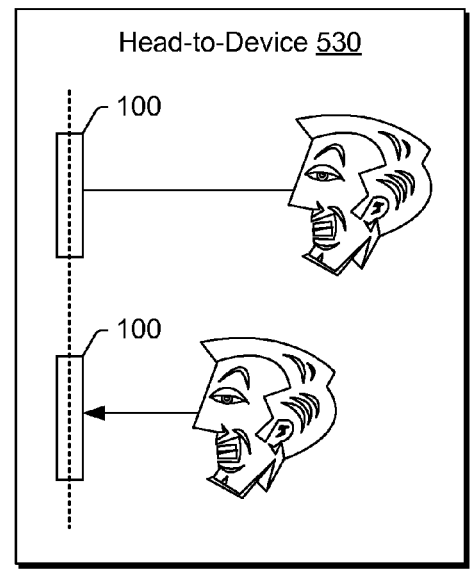
Figure 5:
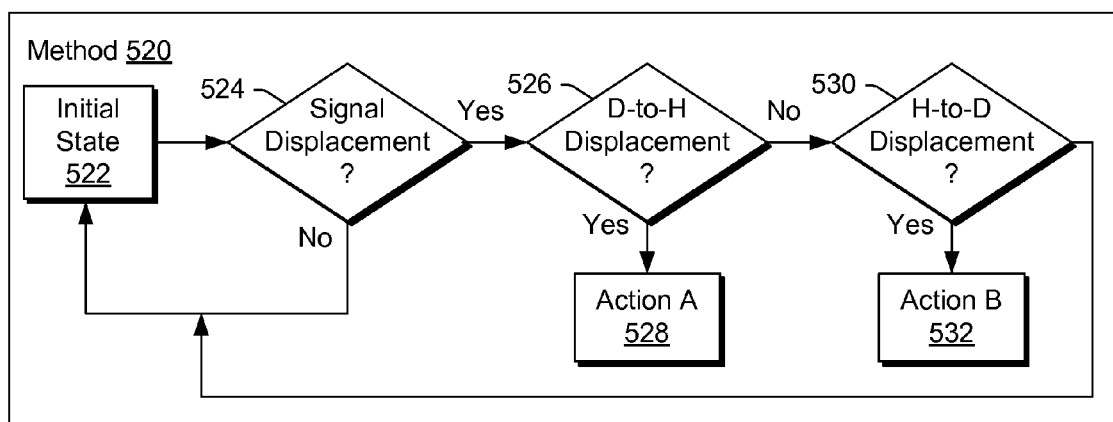

FIG. 5 shows an example of the device 100, in a hand-holdable configuration, along with a method 520 that includes sensing distance between the device 100 and an object such as a user. As described herein, the device 100 may be configured to sense distance from device-to-head 526, from head-to-device 530 or a combination of both. The method 520 commences in an initiation block 522 that registers an initial state (e.g., initial position of the device 100). A decision block 524 decides whether a signal indicates that the device 100 has been displaced from its initial position. If no displacement is indicated, then the method 520 returns to the initiation block 522. However, if the decision block 524 decides that displacement is indicated, then the method 520 continues to another decision block 526 that decides whether the displacement occurred from device-to-head (i.e., the device moved toward a user's head). If so, the method 520 enters an action block 528 that performs action "A", which may be a zoom action. However, if the decision block 526 decides that the indicated displacement is not from device-to-head (e.g., or predominantly from device-to-head), the method 520 continues to another decision block 530 that decides whether the displacement occurred from head-to-device (e.g., or predominantly from head-to-device). If so, the method 520 continues at an action block 532 that performs action "B", which may be a zoom action different than the zoom action "A". If the decision block 530 decides that the indicated displacement is neither sufficiently device-to-head nor head-to-device (e.g., minimal action or noise), the method 520 returns to, for example, the initiation block 522.

Figure 6:
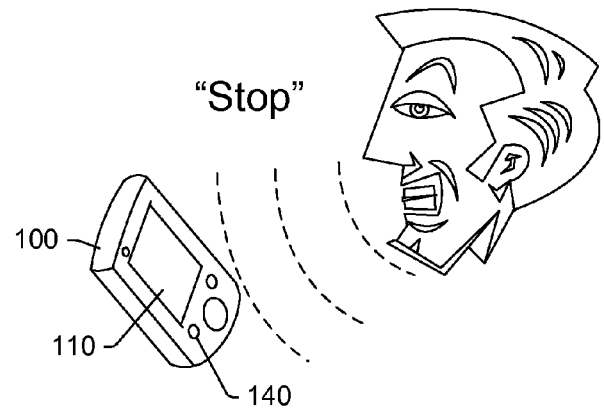
FIG. 6 is a diagram of a device configured to receive audio information and to regulate action based at least in part on received audio information.
Figure 6:
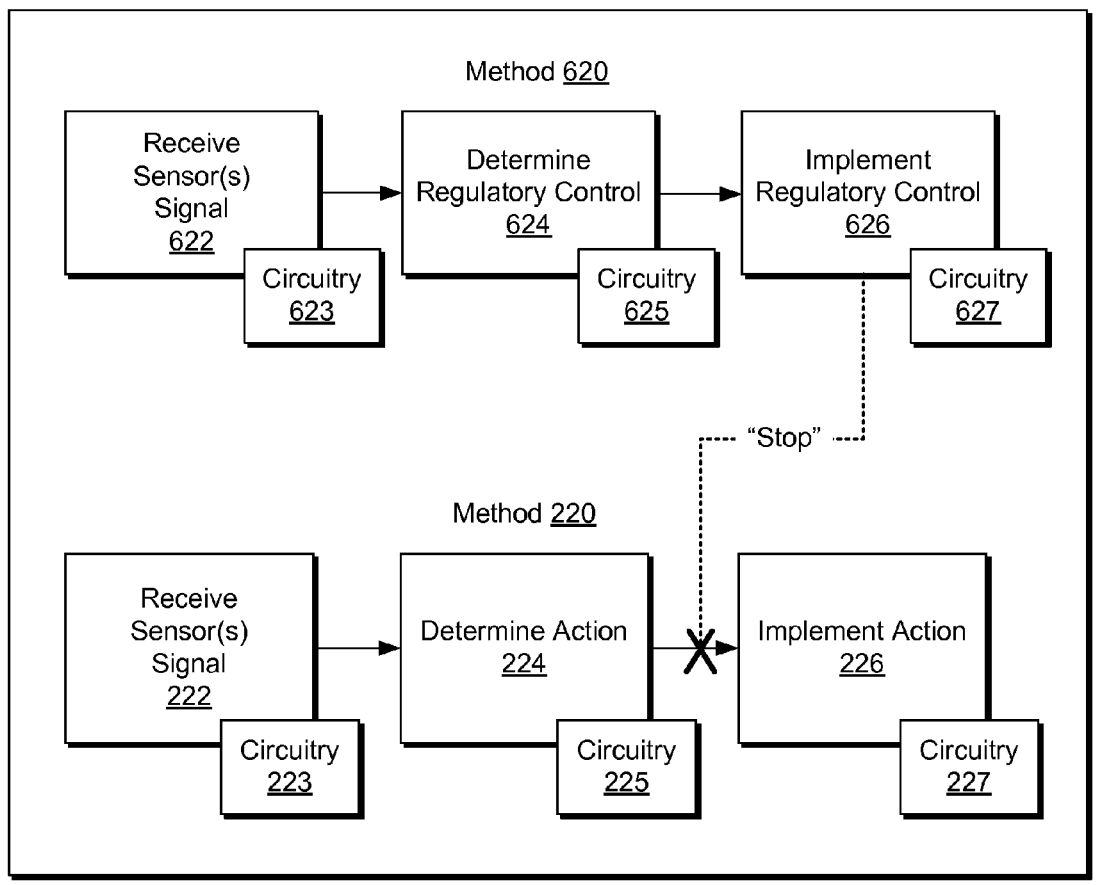

FIG. 6 shows the device 100 configured to receive audio information and to regulate action based at least in part on received audio information. In the example of FIG. 6, the device 100 includes an audio sensor 140 that can sense an audio command issued by a user. As shown in FIG. 6, a method 620 can include regulating another method, such as the method 220, based at least in part on sensed information. In the method 620, a reception block 622 receives one or more signals, a determination block 624 for determining regulatory control and an implementation block 626 to call for and optionally implement regulatory control per the determination block 624. In the example of FIG. 6, the blocks are shown along with circuitry 623, 625 and 627 configured to perform various functions.

In a particular example, the device 100 is configured via application circuitry to change display of information from a landscape view to a portrait view and vice-versa based on orientation of the device 100 with respect to gravity. According to the method 620, upon sensor circuitry 623 sensing an audio command (e.g., "stop"), the regulation circuitry 627 implements a regulatory control action that disables or "stops" the landscape-portrait response of the application circuitry. With this feature disabled, the user may turn the device 100, for example, for viewing displayed information without worrying about the device 100 automatically shifting the display from landscape to portrait or vice-versa.

In the foregoing example, two different types of phenomena are sensed where sensation of an audio phenomenon regulates a response to a spatial phenomenon. As described herein, in an alternative arrangement, a spatial movement may regulate another spatial movement. For example, a quick roll of the device 100 (e.g., about a z-axis) may be sensed by sensor circuitry and regulate a pre-determined response a different spatial movement such as a 90 degree rotation (e.g., about an x-axis). Spatial movement may be distinguished based on one or more characteristics such as pitch, yaw or roll, velocity, acceleration, order, etc. As to order, a spatial input may include, for example, movement from (a) right-to-left or (b) left-to-right or (c) top-left to top-right to bottom-right, etc. Combinations of phenomena may be sensed as well (e.g., consider sensing an audio command in combination with sensing a top-right position of a device). Combinations may aid in registering sensed input or defining a coordinate space relative to a device.

Figure 7:
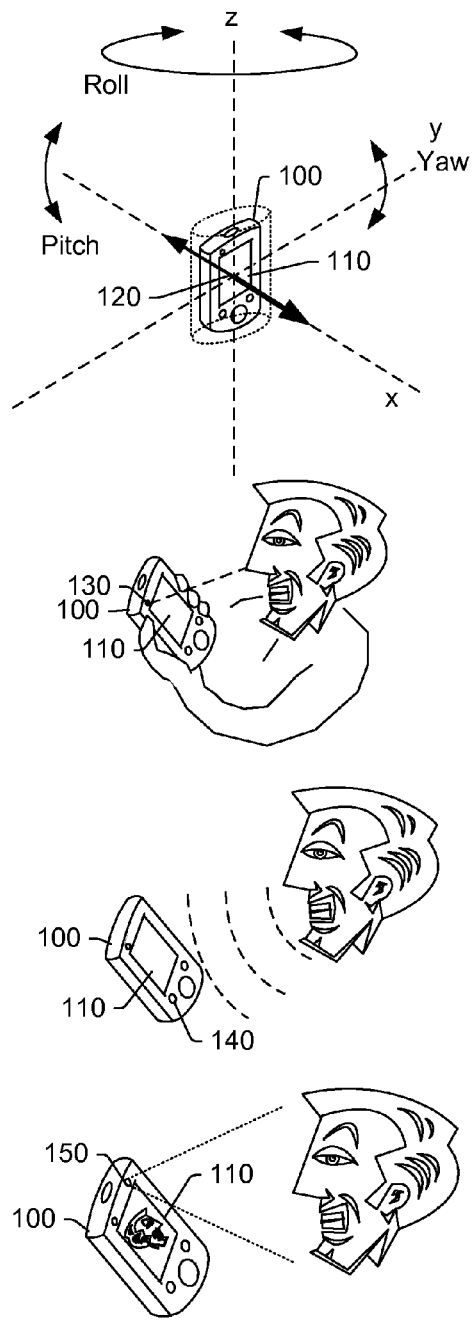
FIG. 7 is a diagram of a device configured with one or more types of sensor circuitry, application circuitry and regulation circuitry.
Figure 7:
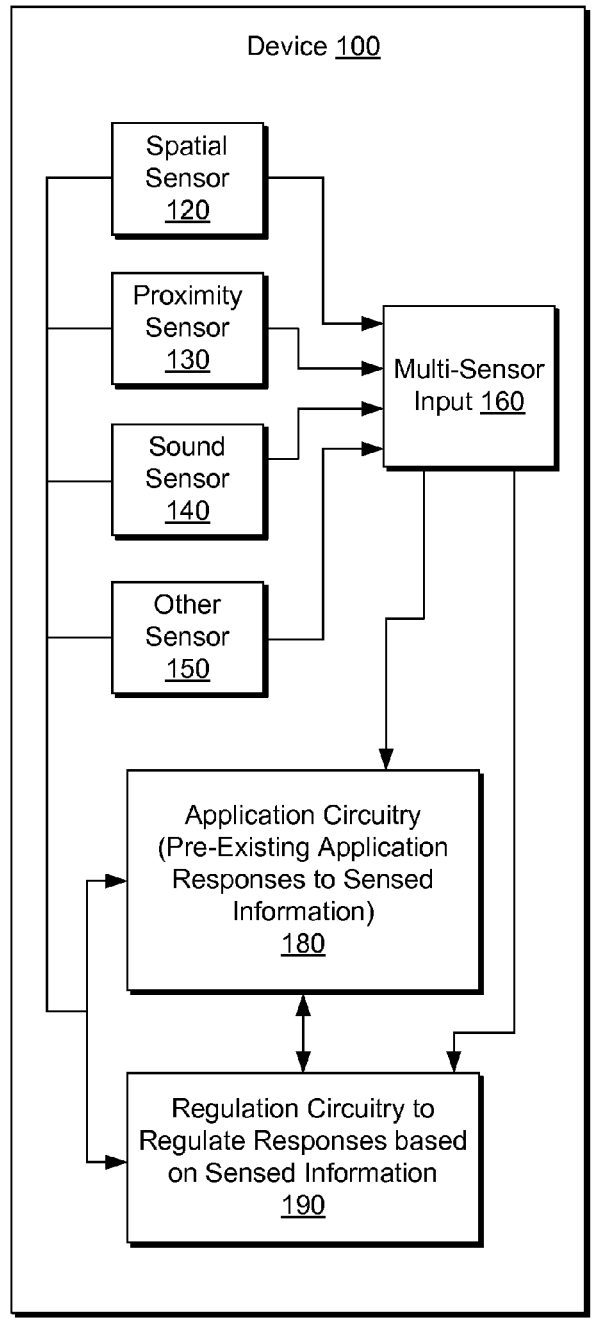

FIG. 7 shows a device 100 configured with one or more types of sensor circuitry 120, 130, 140, 150 and 160, application circuitry 180 and regulation circuitry 190. As indicated, the device 100 may include signal interfaces or other circuitry such that multiple types of sensor signals can be combined, for example, per the multi-sensor input circuitry 160. For example, a signal from the sound sensor circuitry 140 may be combined with a signal from the proximity sensor circuitry 130 to provide sensed information suitable for the application circuitry 180 or the regulation circuitry 190 to respond or regulate. In this example, a user may speak the word "out" while moving the device 100 in a direction along the outward normal (e.g., to the user's head). The circuitry may sense the utterance (e.g., using voice recognition circuitry) and sense the change in proximity to the user and cause an application to zoom out. Similarly, where a user speaks the word "in", the device 100 may sense the utterance and sense the change in proximity and cause an application to zoom in. Such a device may be programmed to zoom "out" or "in" regardless of whether the change is proximity is away from or toward a user (e.g., whether along an inward or outward normal direction). In other words, the sensed utterance may control the type of zoom regardless of direction toward/away where the zoom, whether in or out, occurs in some proportion to a change in proximity (or distance, etc.). The foregoing example is illustrative of some features as other types of sensor input and responses or regulation of responses may be programmed.

In the example of FIG. 7, the sensor circuitry 140 is shown as being configured to sense audio (e.g., spoken commands) and the sensor circuitry 150 is shown as being configured to capture images such as an image of a user. Image analysis circuitry may be configured to determine one or more metrics for calculation of a distance between the device and the user (e.g., to determine proximity to a user).

The application circuitry 180 can include one or more pre-existing application responses to sensed information, whether sensed information based on a single sensor or multiple sensors. For example, an application may be configured to switch from a landscape to a portrait view on a display based on sensed information that indicates the device has been rotated. The regulation circuitry 190 may be configured to regulate such responses based on sensed information. For example, where a device senses a quick rotation about an axis (e.g., long axis in portrait view or long axis in landscape view), such sensed information may act to disable the application circuitry's response to rotation about a different axis (e.g., rotation about an axis that rotates a long axis of a display such as the z-axis of the display 110 of FIG. 1).

As described herein, an apparatus such as the device 100 of FIG. 1, can include a planar display defining an outward pointing normal vector and an inward pointing normal vector, sensor circuitry configured to sense an initial relative position of the planar display and configured to sense a change in relative position of the planar display, and zoom circuitry configured to zoom an image presented on the planar display responsive to a change in relative position of the display sensed by the sensor circuitry wherein the change in relative position comprises a vector component along one of the normal vectors. An example of such a device is shown with respect to FIG. 3. Referring to the method 220 of FIG. 2, circuitry 225 may be configured to determine that a zoom action should occur and circuitry 227 may be configured as zoom circuitry to implement the called for zoom action.

As described herein, a device may include control circuitry configured to control zoom circuitry based at least in part on relative rotational position of a display of the device about a normal vector of the display (e.g., as sensed by sensor circuitry). A device may include control circuitry configured to control zoom circuitry based at least in part on at least one or more of a relative pitch position of a display as sensed by sensor circuitry, a relative yaw position of a display as sensed by sensor circuitry and a relative roll position of a display as sensed by sensor circuitry. For example, control circuitry may be configured to disable zoom circuitry based at least in part on relative position of a display as sensed by sensor circuitry. In various examples, sensor circuitry may be configured to define a three-dimensional coordinate system, optionally with respect to gravity. In various examples, a relative position of a display may be a relative position determined, at least in part, with respect to gravity. A device may include a camera as sensor circuitry to determine, in part, proximity of a planar display to an object and an accelerometer as sensor circuitry to determine, in part, a direction of Earth's gravity with respect to orientation of the planar display. A device may include a positioning system sensor (e.g., GPS) as sensor circuitry.

As described herein, a method can include sensing a change in relative position of a planar display where the change includes a vector component along an outward pointing normal vector defined by the planar display; responsive to the change, zooming an image displayed on the planar display; sensing a change in relative position of the planar display where the change includes a vector component along an inward pointing normal vector defined by the planar display; and, responsive to the change, zooming an image displayed on the planar display. For example, FIG. 3 shows a method 320 where zooming an image displayed on a planar display occurs when a change in relative position of the planar display occurs in a direction with a vector component along an inward pointing normal vector or in a direction with a vector component along an outward pointing normal vector. In FIG. 5, an example of a device 100 is shown along with a method 520 where relative position pertains, at least in part, to proximity (e.g., to a user's head). Hence, a method may include sensing proximity of a planar display to an object.

As described herein, one or more computer-readable media can include processor-executable instructions to instruct a processor to: zoom an image displayed on a planar display, responsive to a sensed change in relative position of the planar display where the change includes a vector component along an outward pointing normal vector defined by the planar display; and zoom an image displayed on the planar display, responsive to a sensed change in relative position of the planar display where the change includes a vector component along an inward pointing normal vector defined by the planar display.

As described herein, an apparatus such as the device 100 of FIG. 1 can include sensor circuitry configured to sense spatial phenomena; application circuitry configured to respond to sensation of a spatial phenomenon by the sensor circuitry where a pre-existing relationship exists between the spatial phenomenon and the response of the application circuitry; and regulation circuitry configured to regulate the response of the application circuitry to the spatial phenomenon based at least in part on sensation of a different spatial phenomenon by the sensor circuitry. For example, FIG. 7 shows various types of sensor circuitry 120, 130, 140, 150 and 160 as well as application circuitry 180 and regulation circuitry 190. The application circuitry 180 may rely on one or more pre-existing relationships to respond to sensed information and the regulation circuitry 190 may regulate a response or responses based on sensed information. For example, the sensor circuitry 140 may sense audio and the sensor circuitry 150 may sense video. Sensed information from such circuitry may cause the device 100 to respond where the response is regulated by sensed video information.

As described herein, regulation circuitry may be configured to disable response of application circuitry to spatial phenomenon, for example, responsive to sensation of the different spatial phenomenon. For example, a yaw motion of the device 100 (e.g., top away) may disable zooming along an inward or outward pointing normal vector (e.g., as defined by a display). Similarly, regulation circuitry may be configured to enable response of application circuitry to spatial phenomenon, for example, responsive to sensation of different spatial phenomenon. For example, a yaw motion of the device 100 may act as an on/off switch for zooming. In such an example, the same yaw motion may be used for on and off or different yaw motions may be used (e.g., top away is "on" and bottom away is "off").

As described herein, a spatial phenomenon may be differentiated from another spatial phenomenon based on time (e.g., a time dependency). For example, a time dependency may be a velocity or acceleration where a slow, steady movement registers as one spatial phenomenon and a fast, accelerating movement registers as another, different spatial phenomenon. A spatial phenomenon may depend on movement of an object with respect to a device (e.g., user moving head toward the device). As described herein, a device may be a mobile phone, a tablet, a notebook, a slate, a pad, a personal data assistant, a camera, or a global positioning system device. A device may optionally include features of one or more such devices (e.g., mobile phone with GPS and camera).

As described herein, a device can include first sensor circuitry configured to sense a first type of physical phenomena; second sensor circuitry configured to sense a second type of physical phenomena; and application circuitry configured to respond to sensation of physical phenomena by the first sensor circuitry and the second sensor circuitry where a pre-existing relationship exists between physical phenomena of the first type and the second type and the response of the application circuitry. FIG. 7 shows the multiple input circuitry 160 as being configured to combine first and second sensor circuitry inputs. Such inputs may be based on sensed distance, sound, light, acceleration or other physical phenomena.

As described herein, a method can include displaying information to a display; sensing a first physical phenomena; redisplaying information responsive to the sensing of the first physical phenomena where a pre-existing relationship exists between the first physical phenomena and the redisplaying of information; sensing a second physical phenomena; and, responsive to the sensing of the second physical phenomena, regulating the pre-existing relationship between the first physical phenomena and the redisplaying of information. For example, FIG. 4 shows a device 100 configured with control circuitry that may zoom an image responsive to sensed proximity to a user. In this example, a roll motion of the device 100 (e.g., a rotation) may cause one of the thumbnail images to be displayed as the main image (e.g., roll right selects next thumbnail image to the right of the currently displayed main image for display as the main image and roll left selects next thumbnail image to the left of the currently displayed main image for display as the main image). A rotation may be followed by a change in relative spatial position or a change in relative spatial position may be followed by a rotation. In such an example, a user can readily navigate multiple images (e.g., displayed thumbnails or yet to be displayed images) and zoom in and out, as desired. While spatial motions are mentioned, one or more audio commands may be used, for example, to zoom or to select a different image for display as a main image (e.g., consider audio commands such as "in", "out", "next", "previous", "forward", "back", etc.).

As described herein, a device may be programmed to perform a method where redisplaying information includes orientating the information to maintain a prior, relative orientation of the information, for example, where the prior, relative orientation may be a landscape orientation or a portrait orientation.

As described herein, a method can include sensing movement; responsive to sensing of movement, altering display of information on an apparatus; sensing different movement; and responsive to sensing of different movement disabling the altering. In such a method, sensing movement may include sensing movement of the apparatus and sensing different movement may include sensing movement of an object with respect to the apparatus (or vice versa). In such an example, sensing different movement may depend on time (e.g., optionally velocity or acceleration or one or more other time based factors).

Figure 8:
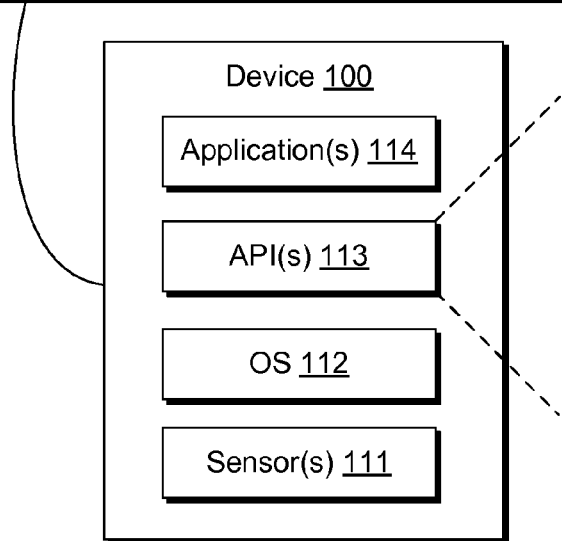
FIG. 8 is a diagram of a device with an example of a graphical user interface.

FIG. 8 shows a device 100 with an example of a graphical user interface 800. The GUI 800 includes various control graphics such as "zoom enable" and "zoom disable". According to the example of FIG. 8, the GUI 800 includes check box graphics that a user may select to associate some physical phenomenon with the zoom enable or disable functions. Specifically, the GUI 800 shows movements including yaw back/forward and roll right/left as well as physical touch or cursor activatable right/left buttons. Thus, for the example of FIG. 8, if a user wanted to enable zoom, the user would perform a "yaw back" maneuver of the device (e.g., tilt top edge back in the example of FIG. 4) and if a user wanted to disable zoom, the user would perform a "yaw front" maneuver of the device (e.g., tilt top edge forward in the example of FIG. 4). Other options may exist to enable and disabled zoom such as a touchscreen gesture, a touchscreen button (see, e.g., on/off buttons in the example of FIG. 4), one or more hardware buttons, voice command, other gesture of the device, etc. As to "zoom max", "zoom min", "zoom start" and "zoom stop", the GUI 800 includes slidebars that allow for user input. The GUI 800 also includes unit selection (e.g., US units or metric units). Yet additional features include "zoom acceleration" and "head-to-device lock". Zoom acceleration may zoom based in part on sensed acceleration (e.g., more zoom with more acceleration) while head-to-device lock may sense movement of a head toward a device and cause a display to prohibit zoom (e.g., to lock the display). Further, the GUI 800 may display a list of applications, for example, with check boxes that allow a user to associate controls with one or more applications. While a single set screen (e.g., GUI) is shown in the example of FIG. 8, a device may be configured with multiple set screens where each screen sets control parameters for one or more applications. For example, one set screen may call for use of button controls to enable/disable zoom for one application (e.g., where device gesture control may distract from use of the application) and another set screen may call for use of roll controls to enable/disable zoom for another application. Accordingly, a GUI can be configured to receive input to tailor zoom control parameters for an application or groups of applications and a series of such GUIs can allow for applications or groups of applications to have different zoom control parameters (e.g., text applications have settings X while image applications have settings Y).

In FIG. 8, the device 100 includes one or more sensors 111, an operating system 112, one or more APIs 113 and one or more applications 114. For example, a sensor may be a hardware device controlled by an operating system where one or more APIs allow an application to access data acquired by the sensor. As described herein, an API may optionally allow an application to control a sensor (e.g., set gain, functionality, etc.). Some examples of APIs include an auto-rotate API, a camera/video API, a sound API, and a display API. For example, an application may call a camera API to access camera data to determine head-to-device distance and call a display API to control a display (e.g., to control rendering functionality for rendering information to the display).

As described herein, various acts, steps, etc., can be implemented as instructions stored in one or more computer-readable media. For example, one or more computer-readable media can include computer-executable instructions to instruct a processor: to zoom an image displayed on a planar display, responsive to a sensed change in relative position of the planar display along an outward pointing normal direction and to zoom an image displayed on the planar display, responsive to a sensed change in relative position of the planar display along an inward pointing normal direction.

In another example, one or more computer-readable media can include computer-executable instructions to instruct a processor: to sense a first type of physical phenomena, to sense a second type of physical phenomena, to respond to sensation of a physical phenomenon of the first type where a pre-existing relationship exists between the physical phenomenon of the first type and the response, and to regulate the response to the physical phenomenon of the first type based at least in part on sensation of a physical phenomenon of the second type.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 9:
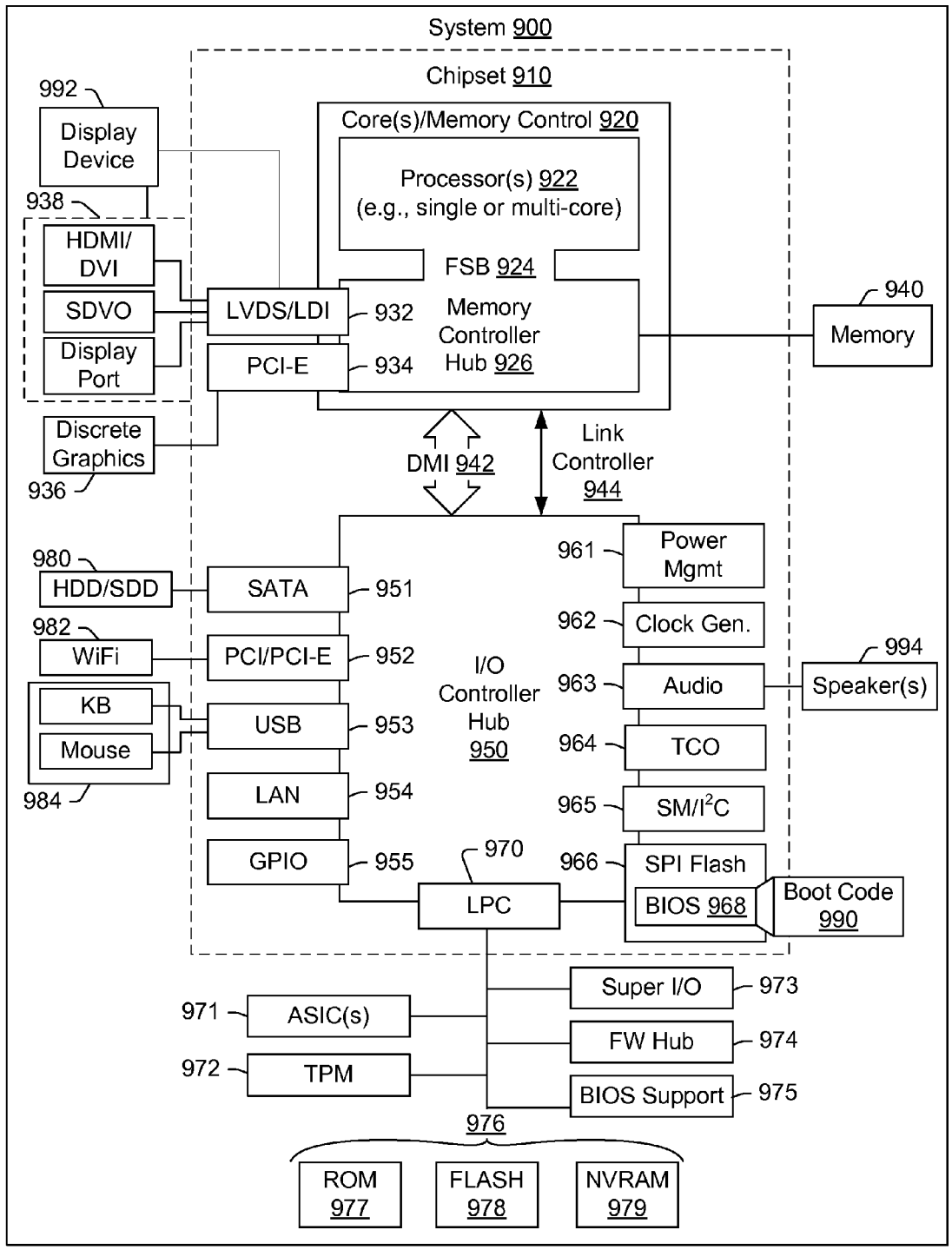
FIG. 9 is a diagram of an exemplary machine, which may be a hand-holdable device or other apparatus.

While various exemplary circuits or circuitry have been discussed, FIG. 9 depicts a block diagram of an illustrative example of a computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a device may include other features or only some of the features of the system 900.

As shown in FIG. 9, the system 900 includes a so-called chipset 910. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. An exemplary system may include AGP or PCI-E for support of graphics.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for erasing, reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), mice and various other devices (e.g., cameras, phones, storage, media players, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979.

With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, an exemplary device or other machine may include fewer or more features than shown in the system 900 of FIG. 9. For example, the device 100 of FIG. 1 may include some or all of the features shown in the system 900 (e.g., as part of basic or control circuitry).

Conclusion

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. An apparatus comprising:
   a processor;
   memory operatively coupled to the processor;
   a planar touchscreen display operatively coupled to the processor;
   sensor circuitry that comprises an accelerometer that senses a spatial phenomenon for determining displacement of the planar touchscreen display along an axis normal to the planar touchscreen display and rotational orientation of the planar touchscreen display about the axis and a detector that senses a spatial phenomenon for determining distance along the axis between the planar touchscreen display and an object;
   zoom circuitry that automatically zooms information presented on the planar touchscreen display responsive to a change in displacement of the planar touchscreen display along the axis sensed by the accelerometer based at least in part on a determined distance between the planar touchscreen display and the object, and based at least in part on information type;
   regulation circuitry that disables zoom of the information by the zoom circuitry based at least in part on a comparison of a determined distance between the planar touchscreen display and the object sensed by the detector to a zoom disable distance.

2. The apparatus of claim 1 wherein the regulation circuitry disables zoom of the image based at least in part on a zoom stop distance.

3. The apparatus of claim 1 wherein the regulation circuitry enables zoom of the image based at least in part on a zoom start distance.

4. The apparatus of claim 1 wherein the sensor circuitry senses, for at least one of the spatial phenomena, a time dependency.

5. The apparatus of claim 4 wherein the time dependency comprises a velocity or acceleration.

6. The apparatus of claim 1 wherein the apparatus comprises a member selected from a group consisting of a mobile phone, a tablet, a notebook, a slate, a pad, a personal data assistant, a camera, and a global positioning system device.

7. The apparatus of claim 1 comprising control circuitry for display of a control graphical user interface to the planar touchscreen display to set a zoom stop distance to disable zoom of the image by the zoom circuitry wherein the zoom stop distance corresponds to a distance between the planar touchscreen display and the object sensed by the detector.

8. The apparatus of claim 1 comprising a processor and memory operatively coupled to the processor wherein the planar touchscreen display is operatively coupled to the processor.

9. The apparatus of claim 1 comprising control circuitry for display of a control graphical user interface to the planar touchscreen display to set one or more zoom control parameters.

10. The apparatus of claim 9 wherein the one or more zoom control parameters comprises a zoom start distance.

11. The apparatus of claim 9 wherein the one or more zoom control parameters comprises a zoom stop distance.

12. The apparatus of claim 9 wherein the one or more zoom control parameters comprises a zoom start distance and a zoom stop distance.

13. An apparatus comprising:
a processor;
memory operatively coupled to the processor;
a planar touchscreen display operatively coupled to the processor;
first sensor circuitry that senses a first type of physical phenomenon associated with displacement of the planar touchscreen display along an axis normal to the planar touchscreen display and rotational orientation of the planar touchscreen display about the axis;
second sensor circuitry that senses a second type of physical phenomenon associated with displacement along the axis of an object with respect to the planar touchscreen display;
zoom circuitry that automatically zooms information presented on the planar touchscreen display responsive to a change in displacement of the planar touchscreen display along the axis sensed by the first sensor circuitry based at least in part on a determined distance between the planar touchscreen display and the object, and based at least in part on information type; and
regulation circuitry that disables zoom of the image by the zoom circuitry based at least in part on a comparison of a displacement between the planar touchscreen display and the object sensed by the second sensor circuitry to a zoom disable distance.

14. The apparatus of claim 13 wherein the first type of physical phenomenon comprises a member selected from a group consisting of distance and acceleration.

15. The apparatus of claim 13 wherein the second type of physical phenomenon comprises a member selected from a group consisting of distance, sound, light, and acceleration.

16. The apparatus of claim 13 wherein the apparatus comprises a member selected from a group consisting of a mobile phone, a tablet, a notebook, a slate, a pad, a personal data assistant, a camera, and a global positioning system device.

17. A method comprising:
displaying information associated with an application to a touchscreen display;
sensing a first physical phenomenon to determine a distance between the touchscreen display and an object;
sensing a second physical phenomenon associated with movement of the touchscreen display along an axis normal to the touchscreen display;
automatically zooming the information on the touchscreen display responsive to the sensing of the second physical phenomenon based at least in part on the determined distance, and based at least in part on information type;
sensing the first physical phenomenon associated with displacement of the object with respect to the touchscreen display, the displacement along the axis normal to the touchscreen display; and
responsive to the sensing of the first physical phenomenon, stopping the zooming responsive to the sensed displacement of the object with respect to the touchscreen display being less than a preset distance.

18. The method of claim 17 wherein the zooming comprises orientating the information to maintain a prior, relative orientation of the information.

19. The method of claim 18 wherein the prior, relative orientation comprises a landscape orientation or a portrait orientation.

* * * * *